(12) United States Patent
Kaneko (10) Patent No.: US 7,753,533 B2
(45) Date of Patent: Jul. 13, 2010

(54) DISPLAY APPARATUS

(75) Inventor: Kazuomi Kaneko, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 918 days.

(21) Appl. No.: 11/513,325

(22) Filed: Aug. 31, 2006

(65) Prior Publication Data

US 2007/0211220 A1    Sep. 13, 2007

(30) Foreign Application Priority Data

Mar. 10, 2006    (JP) .............................. 2006-065026

(51) Int. Cl.
*G03B 21/16* (2006.01)
*G03B 21/18* (2006.01)
*H05K 5/00* (2006.01)

(52) U.S. Cl. ............................ 353/61; 353/52; 454/184

(58) Field of Classification Search ................. 353/119, 353/61, 122, 52, 57, 58, 60; 362/294; 348/748; 454/309, 312, 313, 314, 319, 325, 184; 55/283; 352/243, 146
See application file for complete search history.

(56) References Cited

U.S. PATENT DOCUMENTS

| 5,946,078 | A | 8/1999 | Morimoto et al. | |
| 6,729,154 | B2 * | 5/2004 | Takashima et al. | 62/317 |
| 7,320,524 | B2 * | 1/2008 | Lee et al. | 353/60 |
| 7,484,852 | B2 * | 2/2009 | Kuraie | 353/57 |
| 2004/0212784 | A1 * | 10/2004 | Hsu | 353/61 |

* cited by examiner

*Primary Examiner*—Georgia Y Epps
*Assistant Examiner*—Ryan Howard
(74) *Attorney, Agent, or Firm*—McDermott Will & Emery LLP (57) ABSTRACT

In conjunction with attachment or detachment of a dust filter, a lid disposed to an inlet of a duct operates to close the inlet.

18 Claims, 12 Drawing Sheets

DISPLAY APPARATUS

CLAIM OF PRIORITY

The present application claims priority from Japanese application serial no. JP 2006-065026, filed on Mar. 10, 2006, the content of which is hereby incorporated by reference into this application.

BACKGROUND OF THE INVENTION

The present invention relates to a display apparatus which magnifies an image and projects the image on a screen by use of light valves such as image display elements. The present invention relates to a display apparatus having a dust prevention mechanism for preventing dust from entering an inside of the display apparatus when a dust filter is detached.

In U.S. Pat. No. 5,946,078, a structure of a fan disposed to an inlet of air flow of a duct, and a structure of filters attached before and behind the fan, are disclosed. Only the filter detachably attached upstream of the air flow is exchanged while a shutter is closed, and the fan is stopped.

SUMMARY OF THE INVENTION

In U.S. Pat. No. 5,946,078, the filter downstream of the air flow is not basically exchanged. This filter is fixed to an inner wall surface of the duct, coarse, and plays a peripheral role of the dust prevention. Therefore, when the filter upstream of the air flow is exchanged, fine dust cannot be prevented from entering the duct.

In view of the above problem, an object of the present invention is to provide a display apparatus in which dust ingress can be decreased when a dust filter is exchanged.

One aspect of the present invention is to close an inlet of a duct by operating a lid disposed to the inlet in conjunction with attachment or detachment of the dust filter.

DETAILED DESCRIPTION OF PREFERRED EMBODIMENTS

Embodiments are explained in reference to the drawings below. In all the drawings, elements having the same function are provided with the same symbol. To avoid complexity, an element which has been once explained is not explained repeatedly. A projector using an image display element is explained as an example of a display apparatus.

An embodiment 1 is explained below. FIGS. 1 to 5 explain the embodiment 1.

Figure 1:
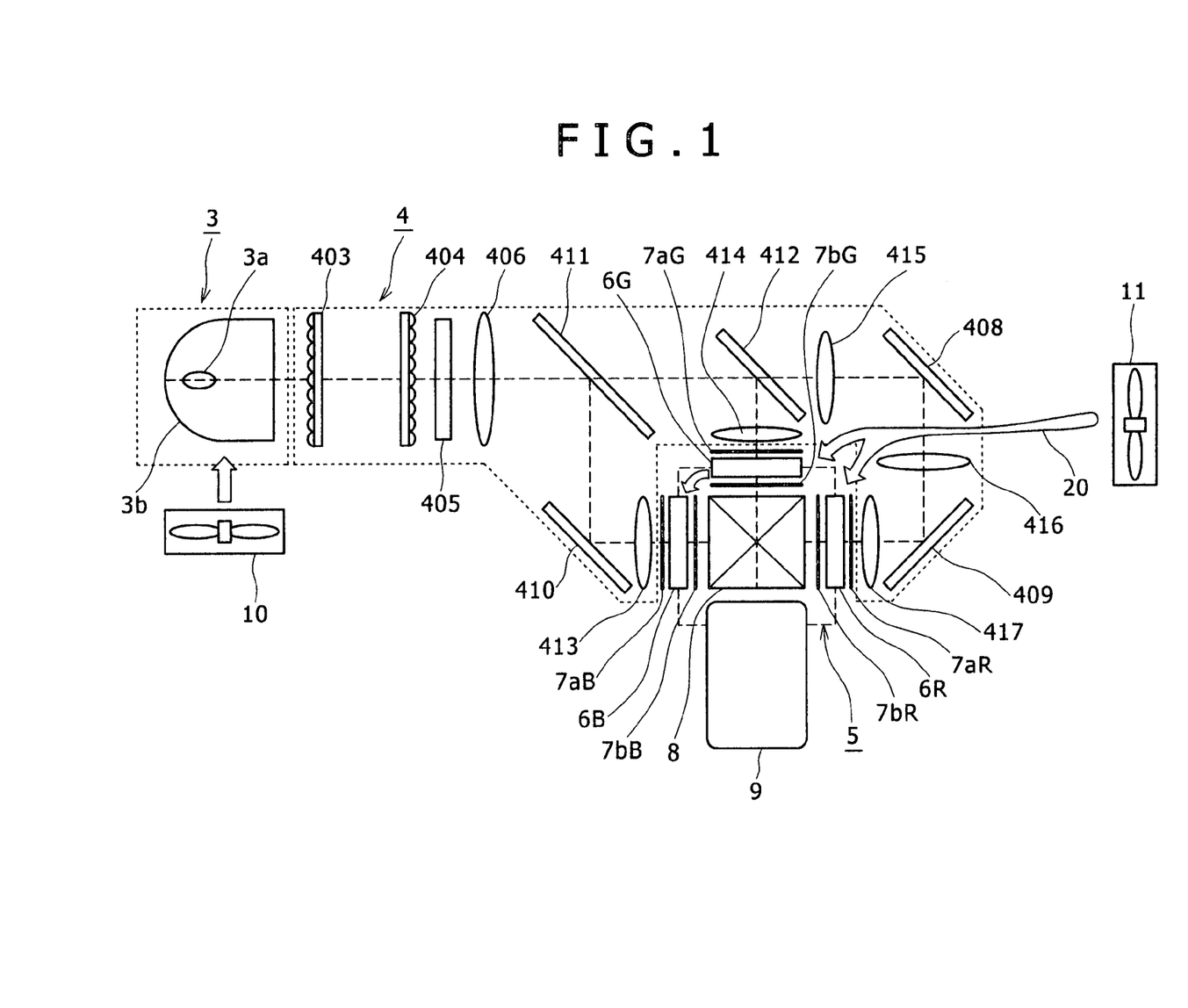
FIG. 1 is a plan view of a projection optical unit of an embodiment 1, the unit being seen from above.
Figure 2:
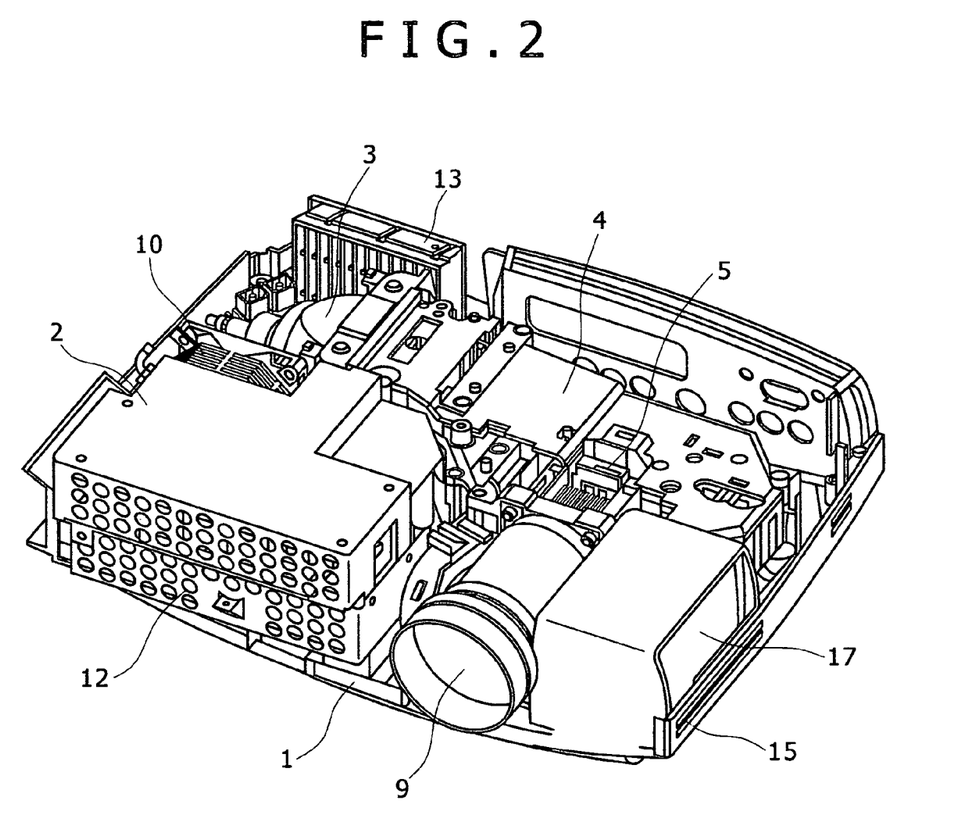
FIG. 2 is a perspective view explaining the inside of a projector of the embodiment 1.
Figure 3:
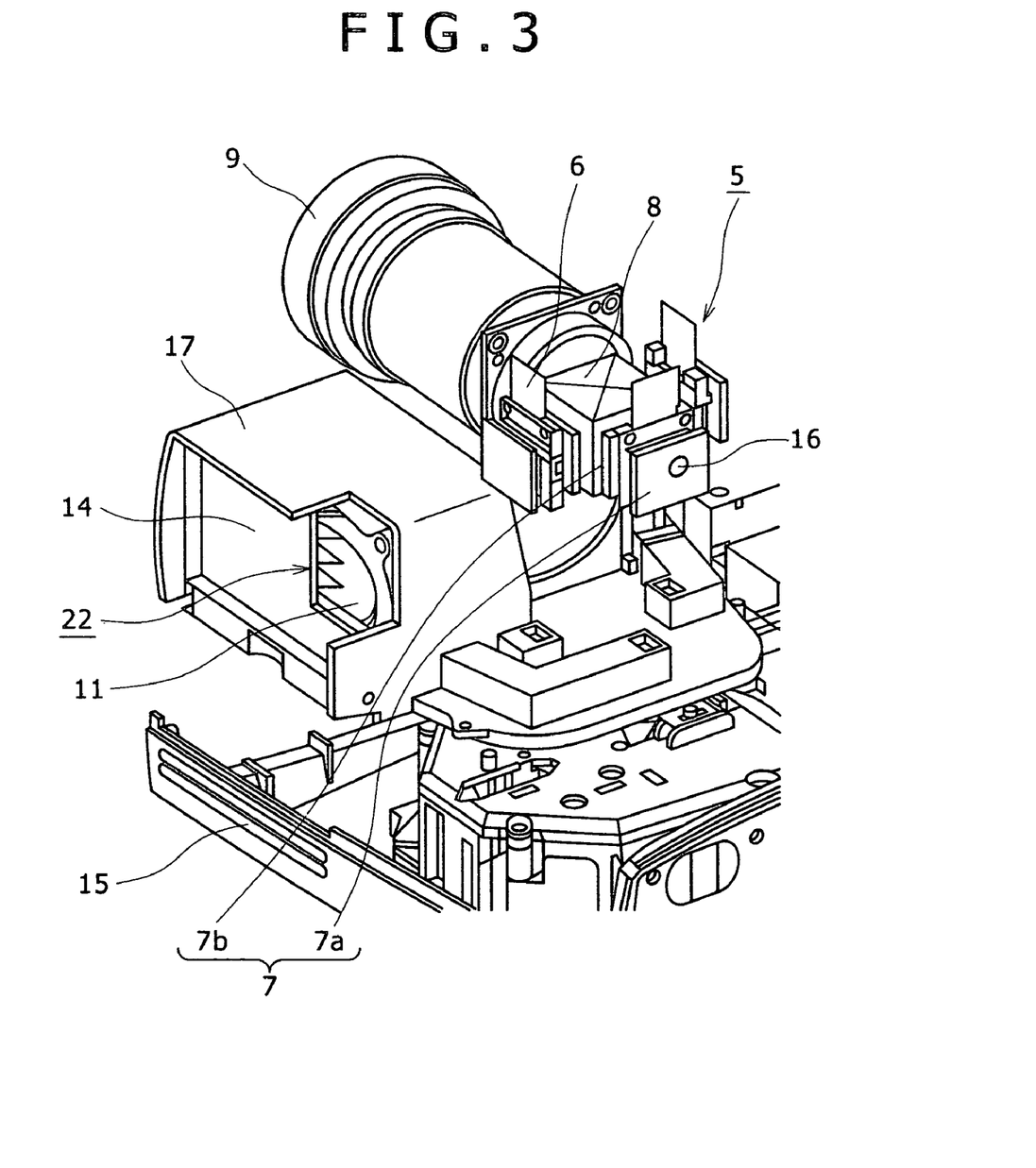
FIG. 3 is an enlarged, detailed perspective view of a duct and a prism unit of the embodiment 1.
Figure 4:
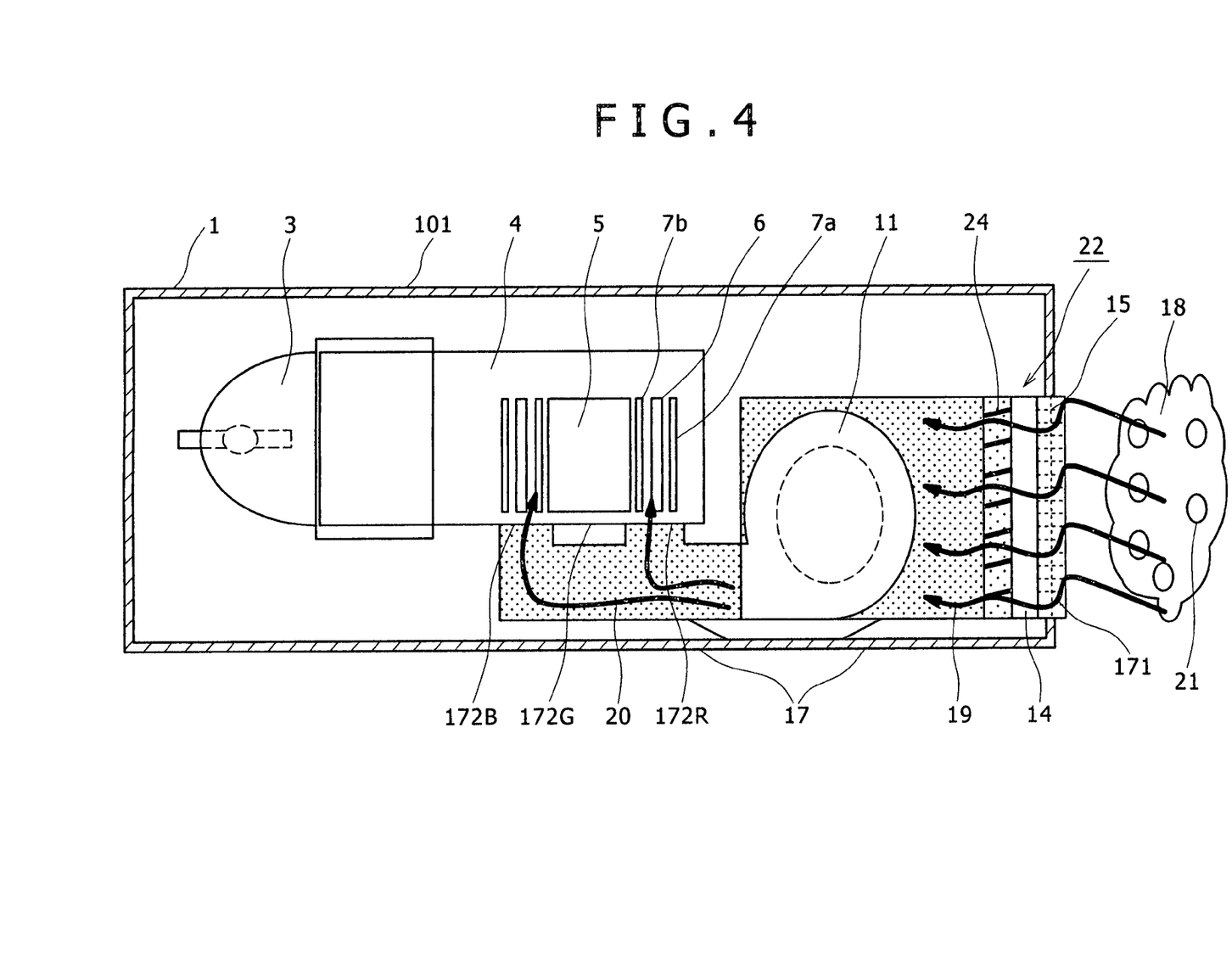
FIG. 4 is a view showing a cooling mechanism of the embodiment 1.
Figure 5A:
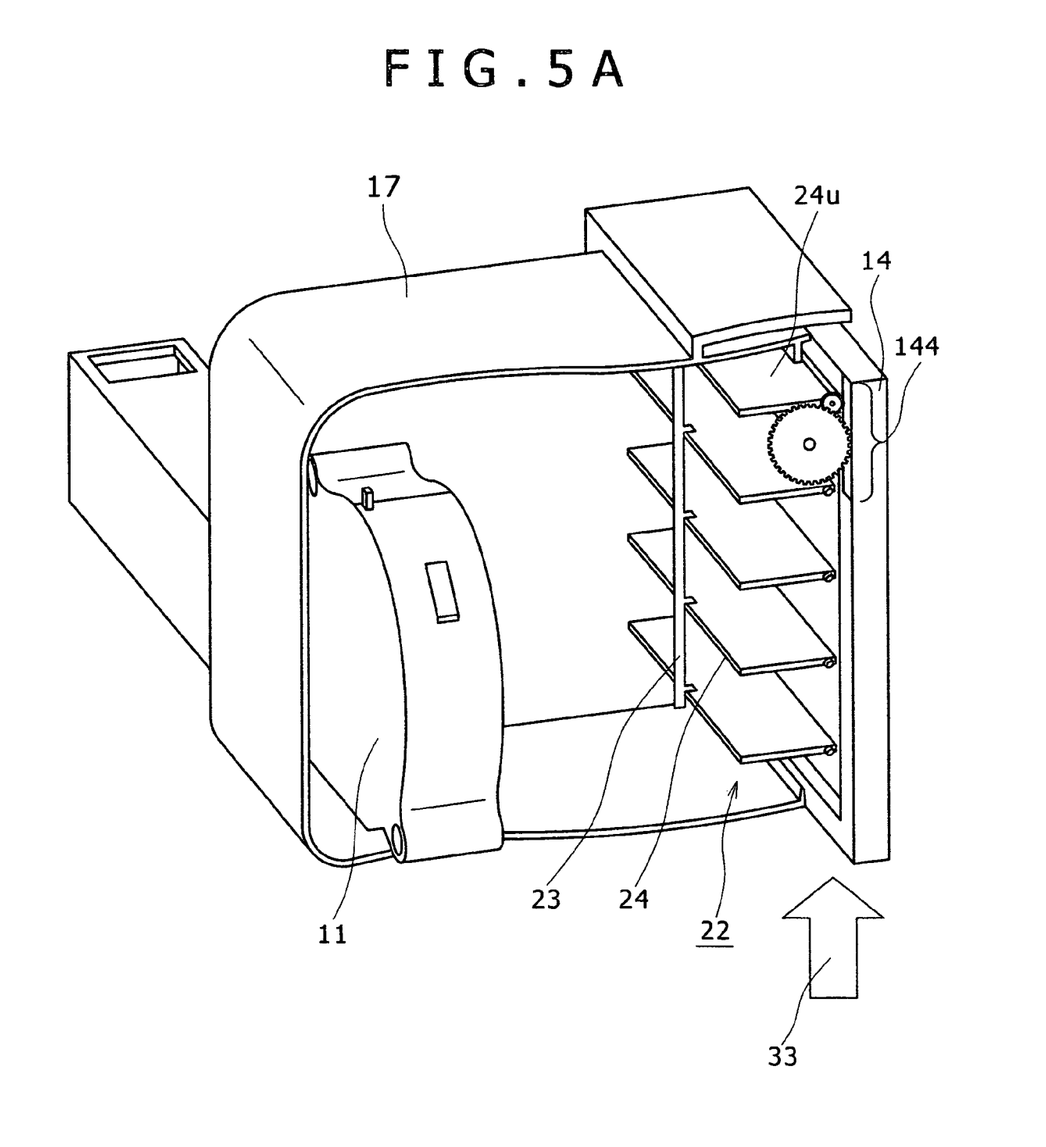
FIGS. 5A, 5B, 5C, and 5D are views explaining a dust prevention mechanism when the dust filter of the embodiment 1 is attached.
Figure 5B:
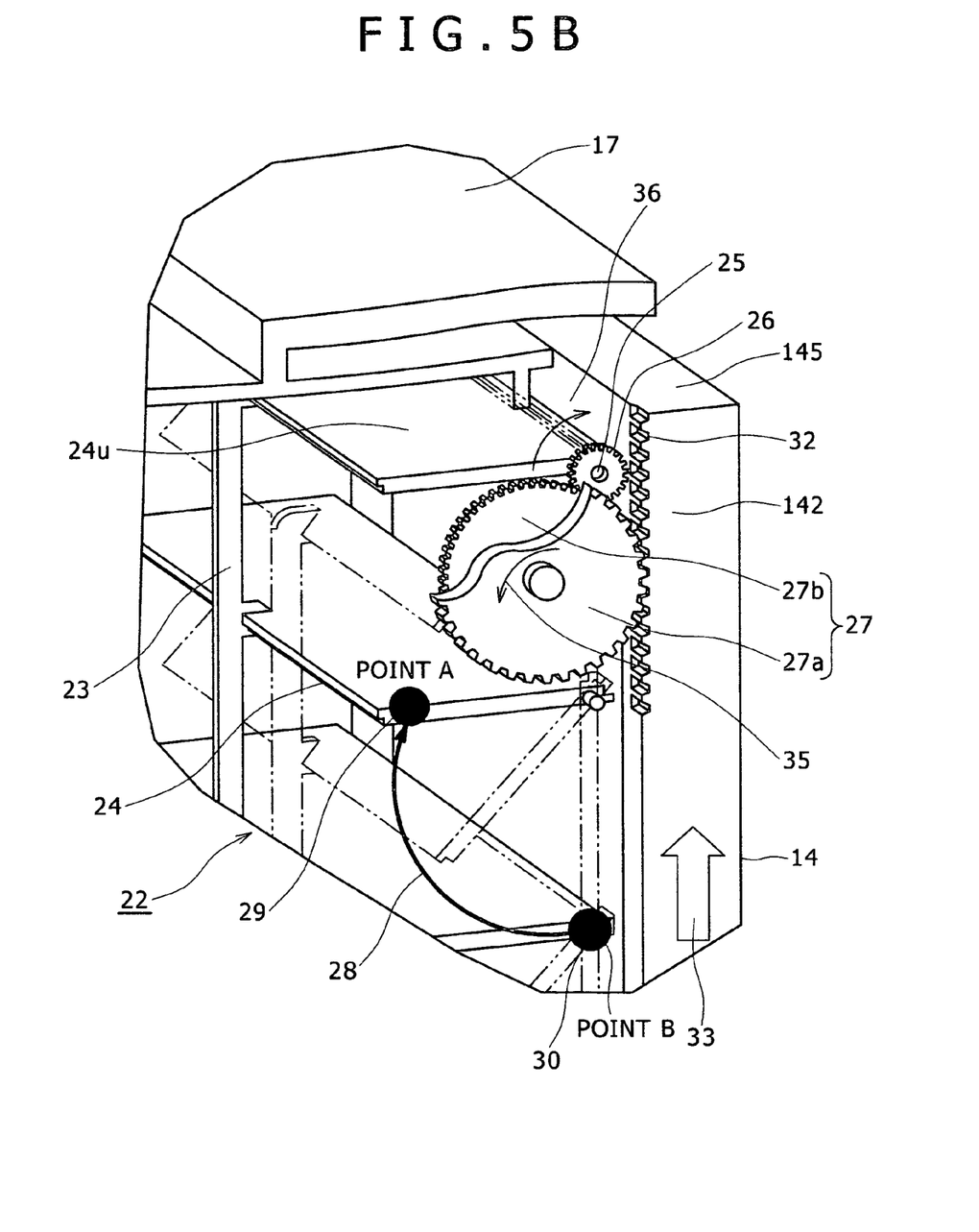
Figure 5C:
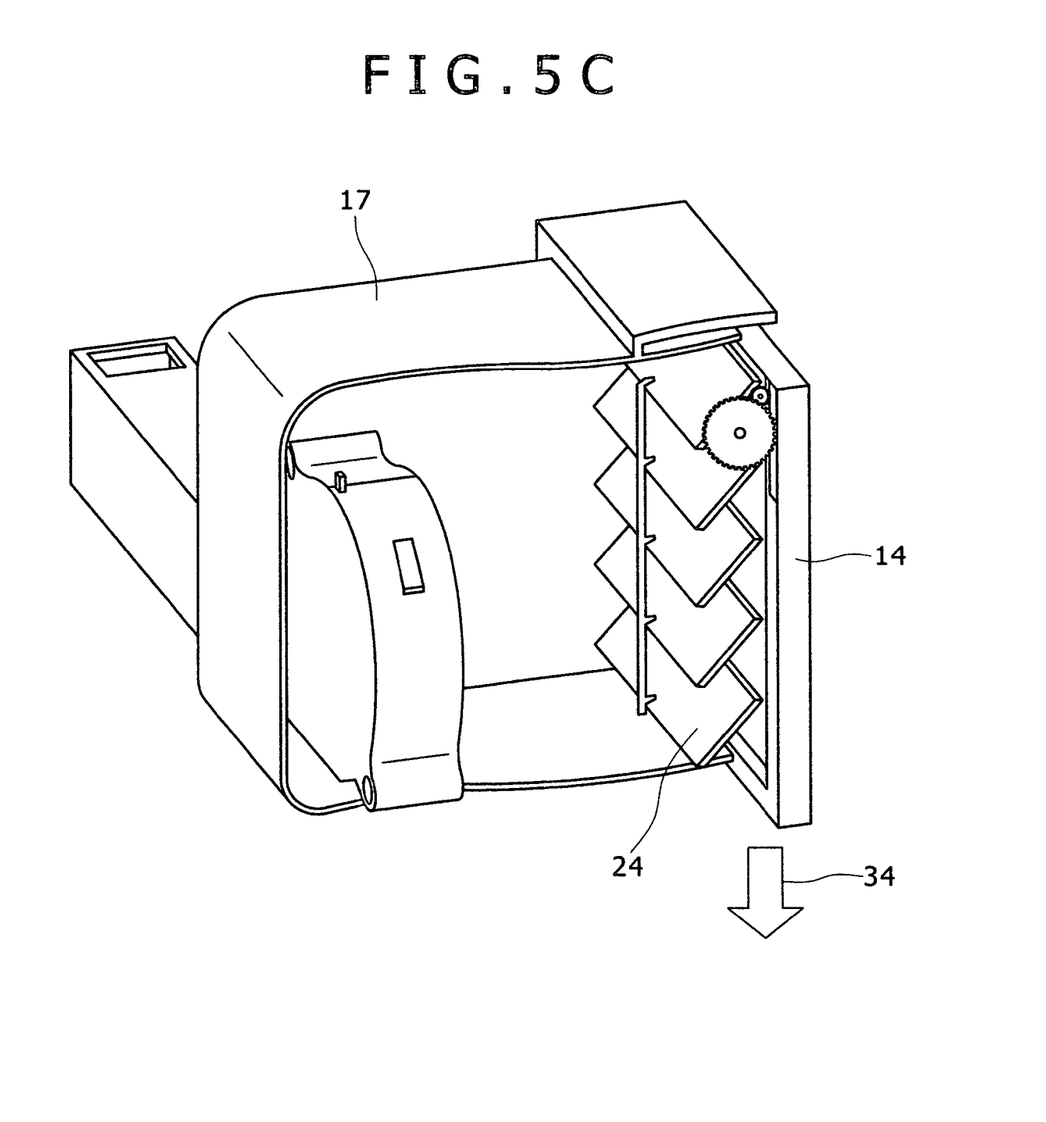
Figure 5D:
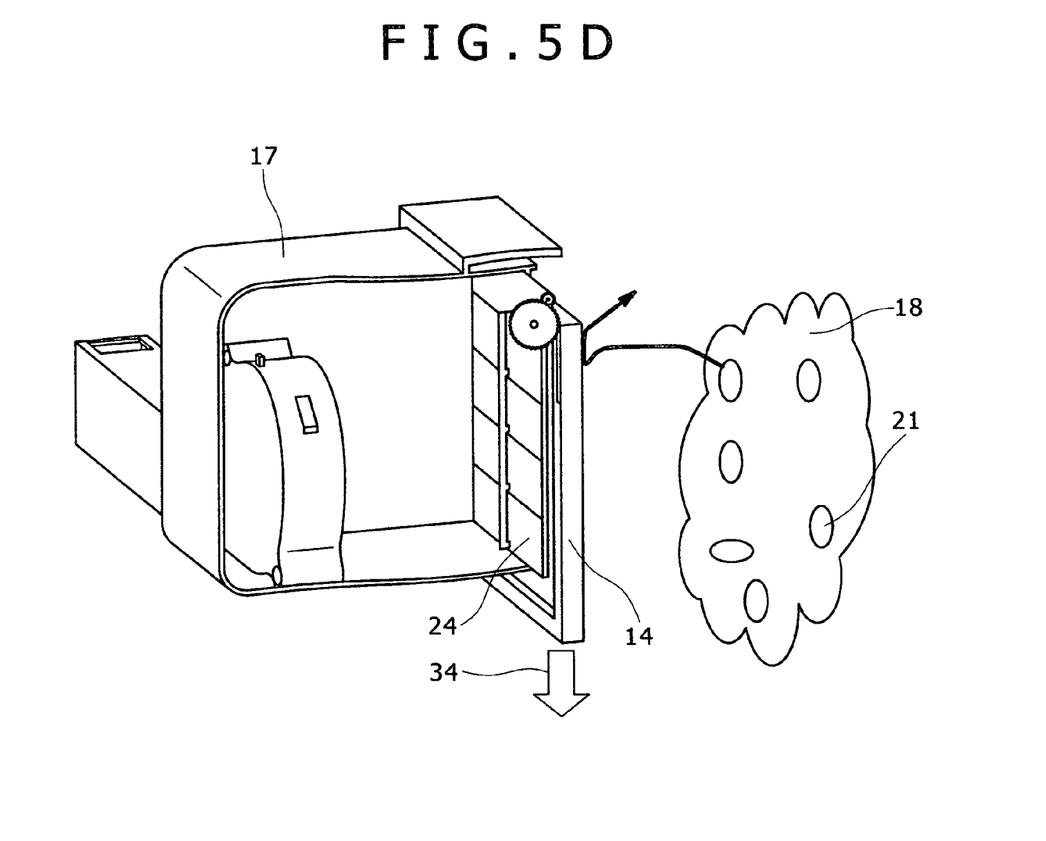

FIG. 1 is a plan view of a projection optical unit of the embodiment 1, the unit being seen from above. FIG. 2 is a perspective view explaining an inside of a projector in which the projection optical unit of the embodiment 1 shown in FIG. 1 is disposed. FIG. 3 is a perspective view explaining detail of a duct and a prism unit of the embodiment 1, which are extracted from FIG. 2, partially omitted, and enlarged. FIG. 4 shows a cooling mechanism of the embodiment 1. FIG. 5 is a view explaining operation of a dust prevention mechanism in conjunction with detachment of a dust filter of the embodiment 1. FIG. 5A is a simplified perspective view of a whole of the dust prevention mechanism of the embodiment 1. FIG. 5B is an enlarged perspective view of a main portion of the dust prevention mechanism. FIGS. 5C, 5D are views for explaining movement when the dust prevention mechanism operates.

First, in reference to FIG. 1, an overview of the projection optical unit disposed in the projector of the embodiment 1 is explained.

As shown in FIG. 1, the projection optical unit includes: a light source unit 3; an illumination optical/color separating unit 4 for leveling (homogenizing) an illumination distribution of light from the light source unit 3 and for separating color of the light to illuminate the light on an image display element such as liquid crystal panels 6 (6R, 6G, 6B); and a prism unit 5 for synthesizing optical images formed on the liquid crystal panels 6 (6R, 6G, 6B) by use of a photosynthesis prism 8 and for projecting the images by use of a projection lens 9.

The light source 3 includes: a lamp 3a, which is a white lamp such as a super-high pressure mercury lamp, a metal halide lamp, a xenon lamp, a mercury xenon lamp, and a halogen lamp; and a reflector 3b for reflecting light from the lamp 3a, converting the light into collimated light, and emitting the collimated light. The light from the light source unit 3 is transmitted through the image display element such as the crystal liquid panels 6 (6R, 6G, 6b) toward a projector lens 9, and projected onto a screen (not shown). The projection optical unit is a whole optical unit from the light source unit 3 to the projection unit 9.

The light emitted from the lamp 3a is reflected by the reflector 3b having, e.g., a paraboloidal or elliptic shape, to be in parallel to a light axis. Then, the light enters the illumination optical/color separating unit 4. The light which has entered the illumination optical/color separating unit 4 first enters a first array lens 403. The first array lens 403 separates the entered light into multiple lights by use of multiple lens cells arranged in a matrix-like configuration. Then, the separated lights are efficiently transmitted through a second array lens 404 and a polarization conversion element 405. Namely, the first array lens 403 is designed so that the lamp 3a and the cells of the second array lens 404 are in object-image relationship (conjugate relationship). As well as the first array lens 403, the second array lens 404 in which multiple lens cells are arranged in a matrix-like configuration projects shapes of the cells of the first array lens 403 onto the liquid crystal panels 6 (6R, 6G, 6B). The cells of the second array lens 404 correspond to ones of the first array lens 403. At this time, in the polarization conversion element 405, the light from the second array lens 404 are aligned in a predetermined polarizing direction. Projection images of the cells of the first array lens 403 are superimposed on the liquid crystal panels 6

(6R, 6G, 6B) through a condensing lens 406, condenser lenses 413, 414, a first relay lens 415, a second relay lens 416, and a third relay lens 417. The second array lens 404 and the condensing lens 406 disposed near the second array lens 404 are designed so that the array lens 403 and the liquid crystal panels 6 (6R, 6G, 6B) are in object-image relationship (conjugate relationship). Multiple lights separated by the array lens 404 are superimposed and projected on the liquid crystal panels 6 (6R, 6G, 6B) by the second array lens 404 and condensing lens 406. As a result, illumination of an illumination distribution having problem-free high uniformity in practical use is possible.

In this process, for example, B light (light of a blue band) is reflected by a dichroic mirror 411, and G light (light of a green band) and R light (light of a red band) are transmitted through the dichroic mirror 411, and separated into two colors of light. G light and R light are separated into G light and R light by a dichroic mirror 412. For example, G light is reflected by the dichroic mirror 412, and R light is transmitted through the dichroic mirror 412, and separated into three colors of light. Various methods for separating the light can be considered. R light may be reflected by the dichroic mirror 411, and G light and B light may be transmitted through the dichroic mirror 411. G light may be reflected by the dichroic mirror 411, and R light and B light may be transmitted through the dichroic mirror 411. B light is reflected by the dichroic mirror 411, reflected by the dichroic mirror 410, and enters the prism unit 5 through the condenser lens 413. G light of G and R light which has been transmitted through the dichroic mirror 411 is reflected by the dichroic mirror 412, and enters the prism unit 5 through the condenser lens 414. R light is transmitted through the dichroic mirror 412, focused through the first relay lens 415, reflected by a reflection mirror 408, focused through the relay lens 416, reflected by a reflection mirror 409, focused through a third relay lens 417, and enters the prism unit 5.

In the prism unit 5, the R light liquid crystal panel 6R, the G light liquid crystal panel 6G, and the B light liquid crystal panel 6B are disposed to adjacent three surfaces of a photosynthesis prism 8. The liquid crystal panels 6R, 6G, and 6B are disposed together with entrance side polarizers 7a (7aR, 7aG, and 7aB) and exit side polarizers 7b (7bR, 7bG, and 7bB), respectively. The projecting lens 9 is disposed to a remaining side of the photosynthesis prism 8.

When B light, G light, and R light which have entered the prism unit 5 respectively passes through the entrance side polarizers 7a, the liquid crystal panels 6, and the exit side polarizers 7b, B light, G light, and R light are converted into optical images corresponding to image signals (not shown). After B light, G light, and R light are synthesized by the photosynthesis prism 8 as a color image, B light, G light, and R light are transmitted, e.g., through a zoom lens such as the projection lens 9, and reach the screen (not shown). An optical image formed on the liquid crystal panels 6R, 6G, and 6B by use of optical intensity modulation is magnified, and projected on the screen by the projection lens 9. This process functions as a display apparatus.

In FIG. 1, the relay lens is not used for a first light path (B light) and a second light path (G light), but the relay lens is used for a third light path (R light) so that the third light path is equal in length to the B light path and to the G light path. The first array lens 403, the second array lens 404, the condensing lens 406, and the like are optical integrators.

The entrance side polarizers 7a, exit side polarizers 7b, and liquid crystal panels are heated by light which is not transmitted through these optical elements. These optical elements are cooled by a fan 11, because the elements have low allowable temperatures. Air introduced from an inlet (not shown) through a dust filter (not shown) by the fan 11 is straightened by a duct (not shown) to be wind 20. The wind 20 is blown on the entrance side polarizers 7a (7aR, 7aG, 7aB), exit side polarizers 7b (7bR, 7bG, 7bB), and liquid crystal panels 6 (6R, 6G, 6B). Then, these optic elements are cooled. A temperature of the light source unit 3 is raised because the light source unit 3 contains the lamp 3a used as a light source. The light source unit 3 is cooled by air introduced by a fan 10 from a side of the reflector 3b. In this case, because the light source unit is cooled from the side of the reflector 3b, a dust filter is not always necessary. The dust filter is not used here.

Next, a projector in which the above-described projection optical unit is disposed, is explained in reference to FIGS. 2, 3.

As shown in FIG. 2, in a projector 1, in accordance with arrangement of FIG. 1, which is a plan view of the projection optical unit, the projection optical unit is disposed.

In the projector 1, the light source unit 3 disposed to a back portion of a left side surface of FIG. 2 receives power supply from a power supply unit 2 disposed to a left front surface of FIG. 2, and emits light. The light enters an illumination optical/color separating unit 4 disposed to a back portion of a rear surface of FIG. 2. The illumination optical/color separating unit 4 levels an illumination distribution of the light which has entered from the light source unit 3, and aligns a polarizing direction of the light to a predetermined polarizing direction. Then, the illumination optical/color separating unit 4 separates the light into three colors of light (R light, G light, B light), and projects the light on the liquid crystal panels. Optical intensities of the R, G, B light which has entered the prism unit 5 (see FIG. 3) disposed to a right center of the FIG. 2, from the illumination optical/color separating unit, are modulated in the liquid crystal panels 6 to form an optical image of each color of light. Color purity and contrast of the R, G, B light are increased through the entrance side polarizers 7a and the exit side polarizers 7b, synthesized by the photosynthesis prism 8 to be image light, and magnified and projected by the projection lens 9.

Because the power supply unit 2, the light source unit 3, the liquid crystal panels 6 and polarizers 7 (7a, 7b) of the prism unit 5, and the like are heated when the projector 1 starts, these components need to be cooled to maintain capability of the components. The power supply unit 2 and the light source unit 3 are cooled by the fan 10. The optical elements such as the liquid crystal panels 6 and polarizers 7 (7a, 7b) are cooled by the fan 11 (shown in FIG. 3).

Accordingly, an air introducing opening for the fan 10, namely, an inlet 12, is provided to a left front surface of an exterior of the projector 1 of FIG. 2, and an inlet 15 for the fan 11 is provided to a front right side of the exterior of the projector 1 of FIG. 2. An outlet 13, through which wind after the cooling is exhausted to an outside of the apparatus, is provided to a left rear surface of the exterior of the projector 1 of FIG. 2.

As shown in FIG. 3, a duct 17 used as a wind path for wind cooling the liquid crystal panels 6 and polarizers 7, is provided to the projector 1. The duct 17 is connected to the inlet 15. The fan 11 is disposed inside the duct 17. A dust filter 14 for removing dust is provided inside the inlet 15 of the duct 17. The dust filter 14 is provided because of the following reason.

Namely, when dust contained in wind adheres to light-transmissive surfaces 16 of the liquid crystal panels 6 and polarizers 7, the dust is magnified and projected to decrease quality of images. Therefore, by use of the dust filter 14, dust flowing (intruding) from the inlet 15 is picked up and removed.

Next, a cooling mechanism for, e.g., the liquid crystal panels 6 and the polarizers 7, the optical elements of the embodiment 1, is explained in reference to FIG. 4. FIG. 4 is a schematic view of only the main portion of the cooling mechanism of the embodiment 1. FIG. 4 schematically shows only a main portion of the cooling mechanism seen from the front, where an unnecessary portion of the cooling mechanism is omitted.

As shown in FIG. 4, the fan 11 is disposed inside the duct 17. An opening portion 171 on one side of the duct 17 is connected to the inlet 15 on a front side of a right side of the exterior of the projector 1. The dust filter 14 and an opening open-close mechanism 22 (after-mentioned in detail) are provided in this order inwardly from an opening portion 171 on the side of the inlet 15 of the duct 17. The dust filter 14 is detachable. Opening portions 172 (172R, 172G, 172B) which are open near lower portions of the liquid crystal panels 6R, 6G, 6B of the prism unit 5, are provided on the other side of the duct 17.

As described later in detail, in the opening open-close mechanism 22, which is the dust prevention mechanism in conjunction with detach of the dust filter, a lid 24 which opens and closes, is open when the filter 14 is disposed. Air 18 introduced from the inlet 15 passes through the opening open-close mechanism 22 after the dust filter 14 removes dust 21.

As described above, because the cooling mechanism is formed, the dust 21 included in the air 18 introduced from the inlet 15 is removed by the dust filter 14. Then, air 19 from which the dust 21 has been removed, blows out of the opening portions 172 (172R, 172G, 172B) as wind 20 by the fan 11. The wind 20 which has blown out of the opening portion 172 is directed upward among the liquid crystal panels 6 and polarizers 7 (7a, 7b), which are the optical elements. In a process where the wind 20 reaches an upper portion of the body, the wind 20 cools the liquid crystal panels 6 and polarizers 7. The air which has reached the upper portion of the body is exhausted from an outlet 13 on a rear side of the projector along an upper exterior case 101 on the upper portion of the body.

As described above, because the liquid crystal panels, polarizers, and the like are cooled by the wind 20 from which the dust 21 has been removed, no dust adheres to light-transmissive surfaces of these optical elements. As a result, projection images are not degraded.

However, as a total operating time becomes long in the projector 1, the dust filter 14 is clogged because the dust 21 adheres to the dust filter 14. Accordingly, capability of the projector 1 cannot be maintained because air introduced by the fan 11 decreases. Therefore, the dust filter 14 is cleaned or exchanged periodically.

At this time, when the dust filter 14 is detached, the inside of the duct 17 is open to the air 18. Regardless of operation of the fan 11, the air 18 containing a lot of the dust 21 enters the duct 17 easily. When the fan 11 operates after the dust filter 14 is cleaned or exchanged, the dust adheres to the light-transmissive surfaces of the liquid crystals and polarizers. Accordingly, projection images may be degraded.

In the embodiment 1, the opening open-close mechanism 22, which opens and closes in accordance with attachment or detachment of the dust filter 14 as the dust prevention mechanism, is provided inside the duct of the dust filter 14 detachably disposed to the duct opening portion 171. Namely, in the embodiment 1, when the dust filter 14 is detached, the opening open-close mechanism 22 closes, and when the dust filter 14 is disposed, the opening open-close mechanism 22 opens.

The opening open-close mechanism 22 in the embodiment 1 is explained in reference to FIG. 5.

As shown in FIGS. 5A, 5B, the opening open-close mechanism 22 in the embodiment 1 includes: multiple lids 24 (one lid may be used) which are elements for adjusting an amount of the air 19 flowing into the inside of the projector; a connecting portion 23 for connecting the lids 24 to each other so that the lids 24 open and close in conjunction with each other; a second driven gear 26 fitted to a rotating shaft 25 provided to the uppermost lid 24 on the drawings (hereinafter, this lid is provided with a symbol u to distinguish this lid from other lids); a first driven gear 27 engaging the second driven gear 26; and the dust filter 14, an outer frame 142 of which has a gear 32 having the same phase as the first driven gear 27.

The lids 24 adjust an amount of the air 19 flowing into the projector, have a rectangle shape, and have a pivot shaft 25 to pivot toward one long side of the rectangle. The pivot shaft 25 of the lids 24 is fitted and fixed to a portion (not shown) of the duct 17. The lids 24 can pivot about the pivot shaft 25. The connection portion 23 engaging the other long side of each lid 24 is provided so that the multiple lids 24 open and close in conjunction with each other.

The second driven gear 26 is fitted to the pivot shaft 25 of the uppermost lid 24u of the multiple lids 24. The second driven gear 26 engages the first driven gear 27 whose pivot shaft is fitted to a portion (not shown) of the duct 17. The first driven gear 27 has a larger pivot radius than that of the second driven gear 26.

The first driven gear 27 is a two-way gear having gears 27a, 27b each having the different number of teeth. The gear 27b engages the second driven gear 26. The gears 27a, 27b have almost the same pivot radiuses. The number of teeth of the gear 27a is greater than that of the gear 27b.

Teeth 32 having the same phase as the gear 27a and engaging the gear 27a of the first driven gear 27, is provided to an upper end area 144 opposite to the gear 27b of the outer frame 142 of the dust filter 14.

As described above, because the opening open-close mechanism 22 is formed, the teeth 32 provided to the upper end area 144 engages the gear 27a of the first driven gear 27 when the dust filter 14 is inserted and attached in a direction of an arrow 33 as described in FIG. 5A. Then, as shown in FIG. 5B, the first driven gear 27 pivots in a direction of an arrow 35. Because the second driven gear 26 engaging the first driven gear 27 also pivots in a direction of an arrow 36 as the first driven gear 27 pivots, the lids 24 can enter an open state from a closed state. When the dust filter 14 is inserted, a head portion 145 of the outer frame 142 of the dust filter 14 abuts the duct 17, and the dust filter 14 has been attached, the lids 24 are in parallel to each other not to resist the flow of the air 19. When the dust filter 14 has been attached, one portion of the outer frame 142 is supported by a dust filter receiving portion (not shown) provided to the opening portion of the duct 17 or to an exterior case (not shown).

As shown in FIGS. 5C, 5D, when the dust filter 14 is separated in a direction of an arrow 34 opposite to the arrow 33, the lids 24 can enter the closed state from the open state, in contrast to the above movement. Accordingly, the lids 24 are perpendicular to the flow of the air (no air flows into the projector). Namely, the lids 24 open and close in a range equal to or under 90 degrees (an error of ±5 degrees may be permitted), to open and close the opening portion 171 of the duct 17.

For more detail, when the dust filter 14 has been attached, an end of the lid 24, the end being positioned opposite to the pivot shaft 25, is held at a movable end point A 29 on a movable orbit 28. The movable end point A 29 is a point where least inflow of air is prevented. When the dust filter 14 has been detached for exchange or cleaning, the end moves to, and is held at a movable end point B 30 on the movable orbit 28 to close the opening portion of the duct 17 from which the dust filter 14 has been detached.

In this case, a gear ratio between the second driven gear 26 and the gear 27b of the first driven gear 27, a gear ratio between the gears 27b, 27a, a pitch of the gear 32 formed to the upper end area 144 of the outer frame 142 of the dust filter 14, and the number of teeth of the gear 32, are set properly so that the lids 24 can move through 90 degrees in conjunction with the attachment or detachment of the dust filter 14.

In the attachment of the dust filter 14 for exchange or cleaning, it is preferable that the opening open-close mechanism 22 does not execute an opening operation until just before the dust filter is completely attached, to prevent the ingress of dust. In the detachment of the dust filter 14 for exchange or cleaning, it is preferable that the opening open-close mechanism 22 executes a closing operation immediately, to prevent the ingress of dust. In the embodiment 1, the first driven gear 27 is disposed near the lid 24u at a deep portion (which means the uppermost position herein) in the inserting direction shown by the arrow 33. Additionally, the teeth 32 formed to the outer frame 142 of the dust filter 14 is formed to the upper end area 144 of the outer frame 142, the upper end area 144 being positioned to the deepest portion in the inserting direction when the dust filter 14 is attached.

As described above, in the embodiment 1, in conjunction with the attachment or detachment of the dust filter 14, the opening portion of the duct 17 can be opened or closed. When the dust filter 14 has been detached for exchange or cleaning, the opening portion of the duct 17 is closed to decrease the ingress of dust. As a result, the degradation of images due to the adhesion of dust can be prevented.

As an alternative of the embodiment 1, for example, a sensor (an infrared sensor as one example, not shown) detects the attachment or detachment of the dust filter 14. In accordance with the detection result, the second driven gear for operating the above-described lids 24 may be driven by a motor driven circuit (not shown).

In the embodiment 1, the fan is contained in the duct. This structure does not limit the embodiment 1. For example, the embodiment 1 is applicable even when the duct is divided into two, between which the fan is disposed.

Figure 6A:
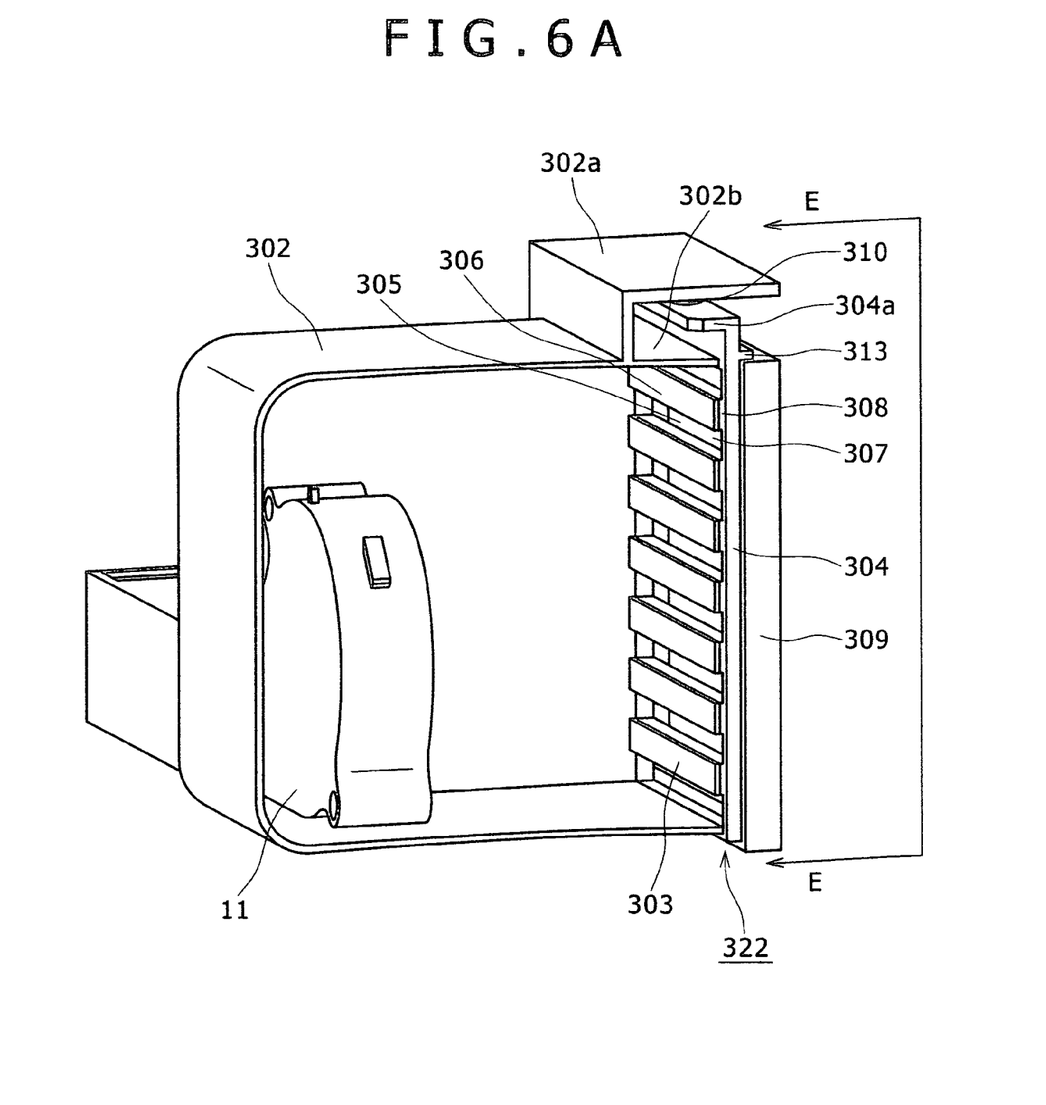
FIG. 6A is a simplified perspective view of a main portion of a dust prevention mechanism of an embodiment 2, where part of a duct is omitted.
Figure 6B:
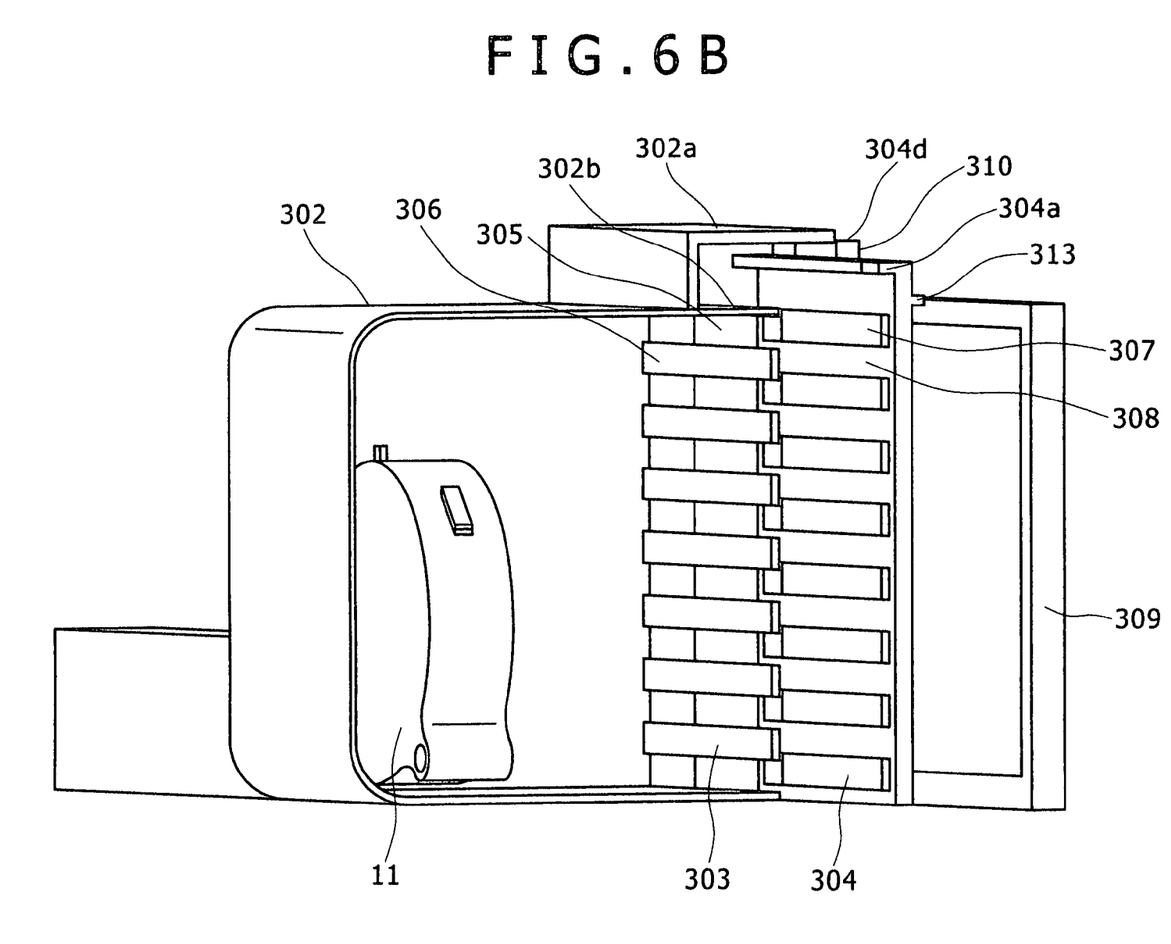
FIG. 6B is an exploded perspective view of the main portion of the dust prevention mechanism of the embodiment 2.
Figure 6C:
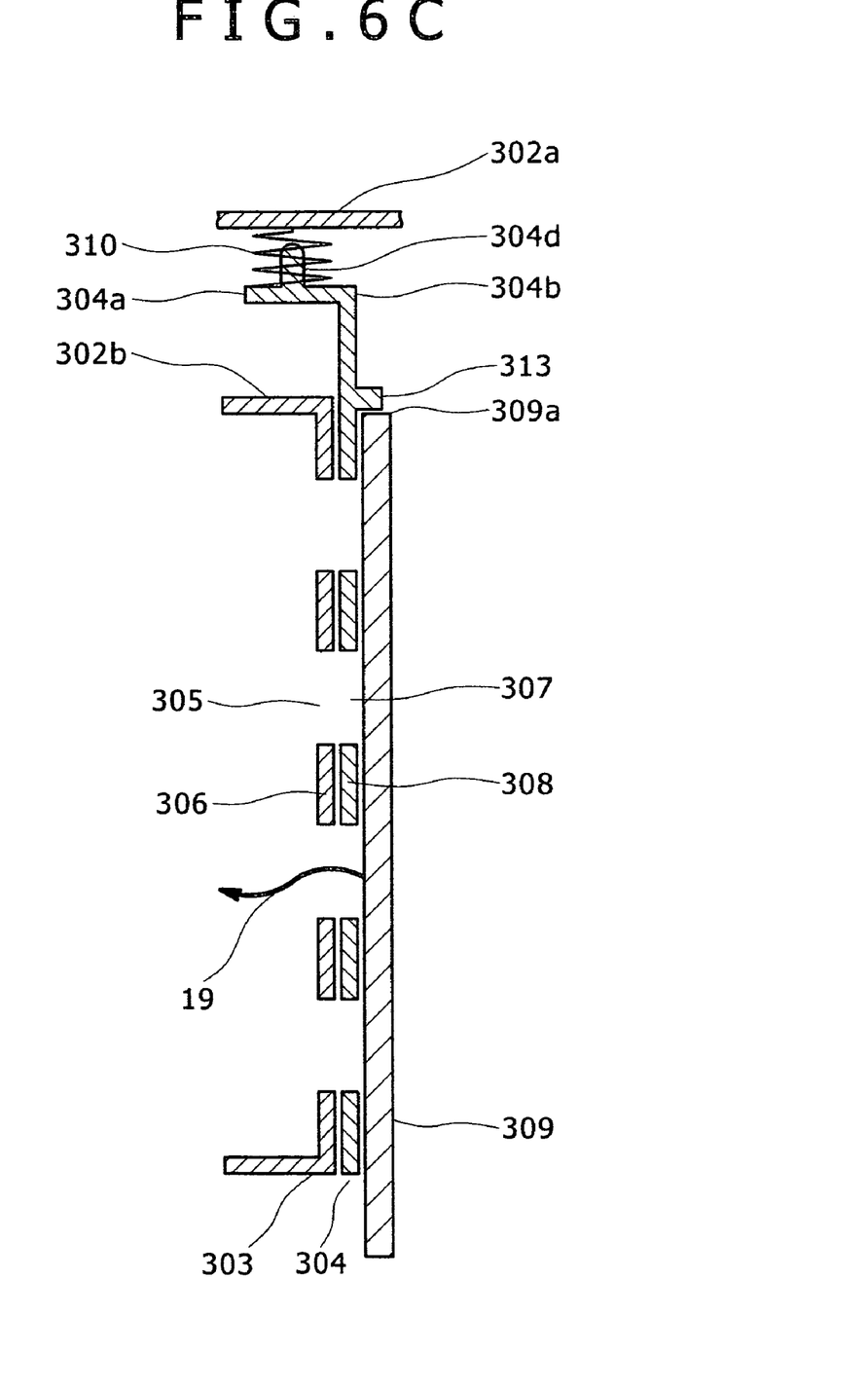
FIG. 6C is a cross sectional view along a line E-E of the dust prevention mechanism of the embodiment 2.
Figure 7A:
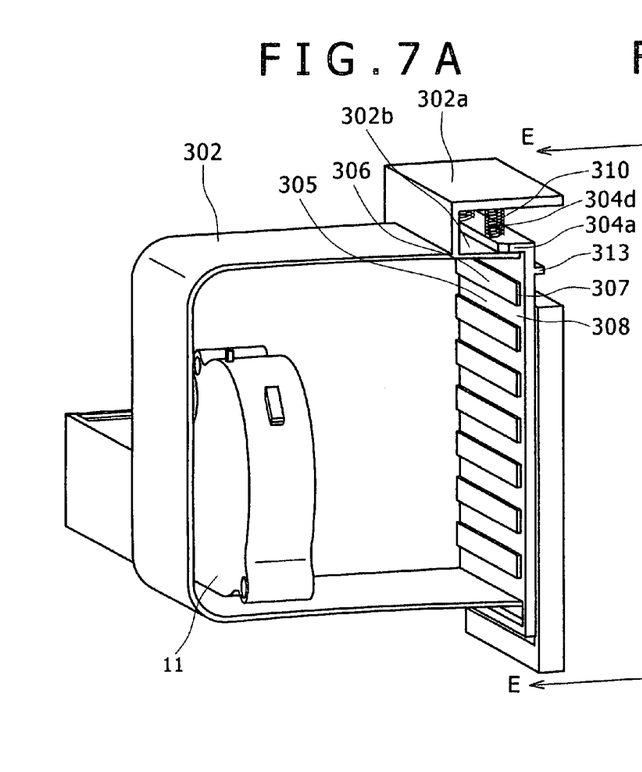
FIGS. 7A, 7B are views explaining operation of the dust prevention mechanism when a dust filter of the embodiment 2 is detached.
Figure 7B:
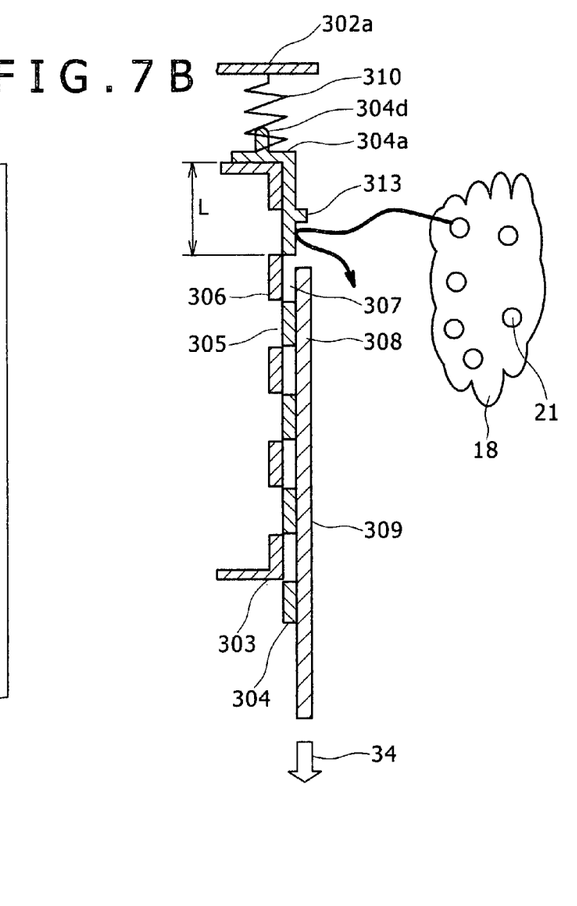

Next, in reference to FIGS. 6, 7, a dust prevention mechanism in conjunction with detachment of a dust filter of an embodiment 2 is explained.

FIG. 6 are explanatory views of operation of the dust prevention mechanism when the dust filter of the embodiment 2 is attached. FIG. 6A is a simplified perspective view showing a main portion of the dust prevention mechanism, where part of a duct is omitted from the main portion. FIG. 6B is an exploded perspective view of the main portion of the dust prevention mechanism. FIG. 6C is a cross sectional view along a line E-E of the dust prevention mechanism.

FIG. 7 are explanatory views of operation of the dust prevention mechanism when the dust filter of the embodiment 2 is detached. FIG. 7A is a simplified perspective view of the main portion of the dust prevention mechanism, where part of the duct is omitted. FIG. 7B is a cross sectional view along a line E-E of the dust prevention mechanism.

First, in reference to FIG. 6, a whole of an opening open-close mechanism 322 as the dust prevention mechanism of the embodiment 2 and the operation when the dust filter is attached, are explained.

As shown in FIG. 6, the opening open-close mechanism 322 as the dust prevention mechanism is provided between a duct 302 and a dust filter 309. The opening open-close mechanism 322 includes: a duct cover 303 provided to the opening portion on the side of the inlet 15 of the duct 302; and an open-close cover 304 provided between the dust filter 309 and a duct cover 303 disposed on a side of the duct 302 of the inlet 15.

As well as in the embodiment 1, the duct 302 is a wind path for the wind 20 for cooling the optical elements such as the liquid crystal panels 6 and the polarizers 7. The fan 11 is disposed in the duct 302. The duct cover 303 is provided to the opening portion on the side of the inlet 15 of the duct 302. A spring supporting portion 302a overhanging toward the inlet is provided to the upper portion of the opening portion on the inlet side of the duct 302 on the drawing. A portion of the duct 302, the portion being positioned to a lower portion of the spring supporting portion 302a, is an open-close cover receiving portion 302b which receives a revered-L-shaped portion 304a of the open-close cover 304 when the dust filter 309 is detached. The open-close cover 304 is after-mentioned.

Multiple lattices 306 having an elongated rectangular shape are arranged to the duct cover 303 at predetermined intervals in the longitudinal direction of the drawing (the direction of height of wind). Openings 305 are formed between the lattices 306 arranged at predetermined intervals. The air 19 introduced from the inlet 15 through the dust filter 309, passes through the openings 305. A width of the openings 305 is the same as that of the lattices 306. Namely, a total area of the lattices 306 deflecting the air 19 is the same as the openings 305.

The open-close cover 304 is a lid member having a reverse-L-shape. Slits 307 having the same width as that of the lattices 306 of the duct cover 303 are arranged to an area opposite to the duct cover 303 at the same intervals (pitches) as the lattices 306 in the longitudinal direction of the drawing. Non-slit portions 308 deflecting the air 19 are provided between the adjacent slits 307. As well as the duct cover 303, the slits 307 and the non-slit portions 308 have the same width. A pin 304d for supporting a spring 310 is formed to an upper surface 304b of the reverse-L-shaped portion 304a overhanging from the open-close cover in the reverse-L-shape. The spring 310 is inserted to the pin 304d, and sandwiched between a spring supporting portion 302a of the duct 302 and the reverse-L-shaped portion 304a of the open-close cover 304. A rib 313 for lifting the open-close cover when the dust filter 309 is inserted is formed to an upper portion of a surface on the dust filter side on the drawing.

When the dust filter 309 is not either inserted or attached, the open-close cover 304 moves downward longitudinally of the drawing by use of the spring 310. The reverse-L shape portion 304a of the open-close cover 304 abuts the open-close cover receiving portion 302b of the duct 302, and is restricted. This results in a state as shown in FIG. 7. The detail is after-mentioned in FIG. 7.

In the opening open-close mechanism 322 structured as described above, the dust filter 309 is inserted, and the upper surface 309a of the dust filter 309 abuts the rib 313 of the open-close cover 304. Then, in conjunction with the insertion of the dust filter 309, the open-close cover 304 is lifted upward in the longitudinal direction of the drawing. When the dust filter 309 is inserted to a predetermined position, and attached to the dust filter receiving portion (not shown) provided to the opening portion of the duct 17 or to a dust filter receiving portion (not shown) provided to an exterior case (not shown), the openings 305 of the duct cover 303 and the slits 307 of the open-close cover 304 coincide with each other.

At this time, the lattices 306 of the duct cover 303 and the non-slit portions 308 of the open-close cover 304 also coincide with each other. Namely, positional relationship between the rib 313 of the open-close cover 304 and the dust filter receiving portion (not shown) is set so that the openings 305 of the duct cover 303 and the slits 307 of the open-close cover 304 coincide with each other.

When the dust filter 309 is attached, the openings 305 of the duct cover 303 and the slits 307 of the open-close cover 304 coincide with each other. Accordingly, the openings 305 of the duct cover 303 open maximally. As a result, the air 19 from which the dust 21 has been removed is introduced into the duct 302 efficiently, and the optical elements such as the liquid crystal panels 6 and the polarizers 7 can be cooled by the fan 11.

In reference to FIG. 7, operation when the dust filter of the opening open-close mechanism 322 is detached, is explained.

As shown in FIG. 7, when the dust filter 309 is separated in the direction of the arrow 34, and detached, the open-close cover 304 moves by use of the spring 310 downwardly of the drawing. Then, the reverse-L-shape portion 304a of the open-close cover 304 abuts the open-close cover receiving portion 302b of the duct 302, and is restricted. At this time, a length L from the reverse-L-shaped portion 304a of the open-close cover 304 to the uppermost slit portion of the open-close cover is set so that the openings 305 of the duct cover 303 are shielded by the non-slit portions 308 of the open-close cover 304 when the reverse-L-shape portion 304a is restricted.

As described above, when the dust filter 309 is detached, the openings 305 of the duct cover 303 are shielded by the non-slit portions 308 of the open-close cover 304 completely in conjunction with the detachment. Namely, the opening open-close mechanism 322 closes. As a result, the air 18 containing the dust 21 is not introduced into the duct 302. Accordingly, the degradation of images due to the adhesion of dust can be prevented.

As described above, the ingress of dust when the dust filter is exchanged, can be decreased.

What is claimed is:

1. A display apparatus for illuminating light from a light source unit onto an image display element which converts the light to an optical image in accordance with an image signal, and for projecting light from the image display element, the display apparatus comprising:
    a dust filter disposed to a surface of a body of the display apparatus;
    at least one lid disposed to the surface of the body of the display apparatus; and
    a mechanism for operating the dust filter and the lid in conjunction with each other so that said lid enters an open state when said dust filter is attached and said lid enters a closed state when said dust filter is separated.

2. A display apparatus for illuminating light from a light source unit onto an image display element which converts the light to an optical image in accordance with an image signal, and for projecting light from the image display element, the display apparatus comprising:
    a dust filter disposed to a surface of a body of the display apparatus;
    at least one lid disposed to the surface of the body of the display apparatus; and
    a mechanism for operating the dust filter and the lid in conjunction with each other wherein the mechanism is formed of a first driven gear,
    the dust filter is formed to engage the first driven gear, and the lid has a second driven gear formed to engage the first driven gear and a pivot shaft for pivoting the second driven gear.

3. The display apparatus according to claim 2,
    wherein the at least one lid has at least a first lid and a second lid,
    the first lid has the second driven gear and the pivot shaft, and
    the first lid and the second lid are connected to each other by use of a connecting portion.

4. The display apparatus according to claim 2,
    wherein the first driven gear has a first gear and a second gear,
    the first gear engages the dust filter, and
    the second gear engages the second driven gear.

5. The display apparatus according to claim 4, wherein a number of teeth of the first gear is different from a number of teeth of the second gear.

6. The display apparatus according to claim 4, wherein a number of the teeth of the second gear is greater than a number of the teeth of the first gear.

7. The display apparatus according to claim 2, wherein the surface is a side surface.

8. The display apparatus according to claim 7, wherein a duct is formed in the display apparatus, and
    the surface is a surface to which an inlet of the duct is formed.

9. The display apparatus according to claim 1, wherein the lid operates in a range equal to or under 90 degrees.

10. A display apparatus for illuminating light from a light source unit onto an image display element which converts the light to an optical image in accordance with an image signal, and for projecting light from the image display element, the display apparatus comprising:
    a mechanism formed of a first driven gear;
    a dust filter formed to engage the first driven gear, and disposed to a surface of a body of the display apparatus; and
    at least one lid having a second driven gear formed to engage the first driven gear and a pivot shaft for pivoting the second driven gear, and disposed to the surface of the body of the display apparatus inwardly from the dust filter in the direction of air flow.

11. The display apparatus according to claim 10,
    wherein the first driven gear has a first gear and a second gear,
    the first gear engages the dust filter, and
    the second gear engages the second driven gear.

12. The display apparatus according to claim 11, wherein a number of teeth of the first gear is different from a number of teeth of the second gear.

13. The display apparatus according to claim 11, wherein a number of the teeth of the second gear is greater than a number of the teeth of the first gear.

14. The display apparatus according to claim 10, wherein the surface is a side surface.

15. The display apparatus according to claim 14, wherein a duct is formed in the display apparatus, and the surface is a surface to which an inlet of the duct is formed.

16. The display apparatus according to claim 10, wherein the lid operates in a range equal to or under 90 degrees.

17. A display apparatus for illuminating light from a light source unit onto an image display element which converts the light to an optical image in accordance with an image signal, and for projecting light from the image display element, the display apparatus comprising:
- a duct provided in the display apparatus;
- a duct cover formed of at least one lattice, and disposed to an inlet of the duct;
- a dust filter disposed to the inlet of the duct;
- an open-close cover formed of at least one slit portion, a rib for supporting the dust filter, and a spring; and
- a spring supporting portion for supporting the spring, wherein the open-close cover is such that when the dust filter is detached, the spring operates so that the inlet is closed by the lattice and the slit portion.

18. The display apparatus according to claim 17, wherein the inlet of the duct is formed to a side surface of the display apparatus.

* * * * *